Aug. 19, 1958   R. H. ZEILMAN ET AL   2,848,084
TRANSVERSELY ENGAGED CLUTCH WITH COMPENSATING MEANS
Filed April 23, 1956   2 Sheets-Sheet 1

INVENTORS
ROY H. ZEILMAN AND
BY GEORGE C. NOLL

Oberlin & Limbach
ATTORNEYS.

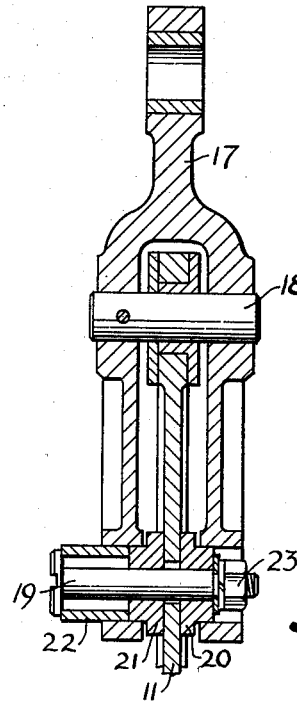
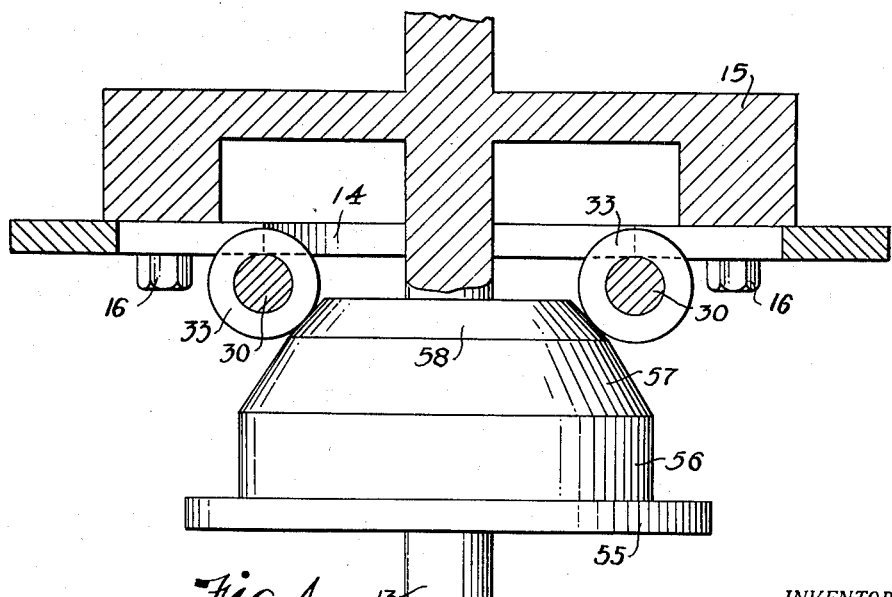

United States Patent Office 2,848,084
Patented Aug. 19, 1958

2,848,084

TRANSVERSELY ENGAGED CLUTCH WITH COMPENSATING MEANS

Roy H. Zeilman, Elyria, and George C. Noll, North Ridgeville, Ohio, assignors to The Thew Shovel Company, Lorain, Ohio, a corporation of Ohio Application April 23, 1956, Serial No. 579,977

3 Claims. (Cl. 192—76)

This invention relates, as indicated, to clutches and more specifically to clutches which are used to connect a rotating shaft to an external coaxial drum.

In such devices as cranes, power shovels, and the like, clutches of the type described are used in the drive mechanisms for drums on which cables are wound. It has been found in the past that as the friction linings of such clutches are worn away during use, unduly great forces are required to engage the clutches because the moving part of the clutch must be strained in order to effect a firm contact between the friction lining and the interior surface of the drum. Thus, unreasonable maintenance expenses are incurred in frequent adjustments.

A similar problem has been encountered in engaging the clutch after the friction lining has been permitted to slip along the inner surface of the drum for any substantial period of time. This is the case because, when the slippage is permitted, the body of the drum heats up increasing its internal diameter.

It is, therefore, the principal object of this invention to provide a clutch of the type described in which the internal parts will automatically compensate for changes in the distance the friction linings must be moved to engage the inner surface of the drum.

It is a further object of this invention to provide a clutch of the type described wherein there is provided between the friction element thereof and the clutch actuating means a resiliently deformable element which will permit the actuating means to be moved a distance greater than that required to engage the clutch so that the resiliency of the deformable element will maintain the clutch in engagement if the friction element is worn down or the drum expanded due to thermal changes.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

In said annexed drawings:

Fig. 3 is a cross-sectional view of the apparatus of Fig. 1 taken along the line 3—3; and Fig. 4 is a longitudinal view of the clutch illustrated in Fig. 1, here showing the support and actuating means of the clutch.

Figure 1:
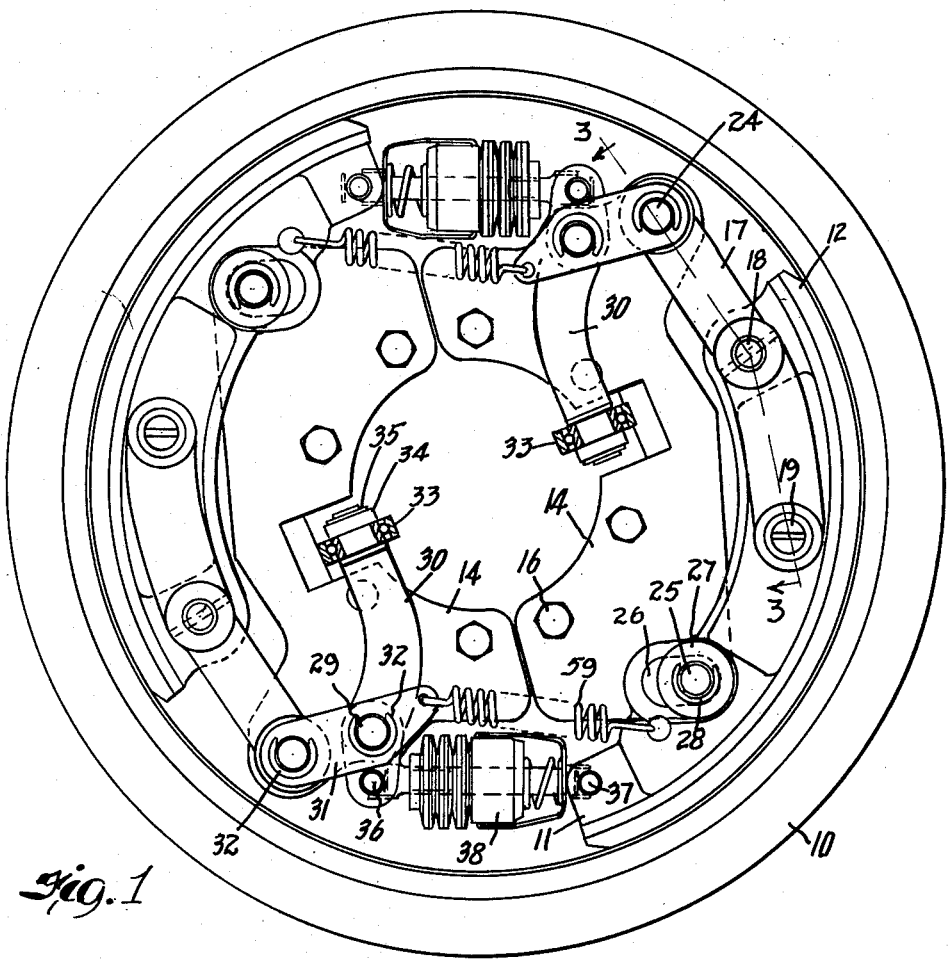
Fig. 1 is an axial view of one embodiment of our invention.

Broadly stated, our invention comprises a clutch assembly wherein a shoe, connected for rotation with a driving member, is moved into an arrested position in frictional driving engagement with a friction surface on a driven member arranged concentrically with the axis of rotation of said driving member by means of a leverage having a follower engaging the substantially coniform surface on a cam member which is likewise concentric with said axis of rotation, the improvement which comprises providing on such cam member a substantially cylindrical surface adjacent that end of said coniform surface at which said shoe will be under greatest load, and a resiliently deformable element in said linkage permitting said follower to continue its movement along the coniform portion of said cam and onto said cylindrical surface after movement of said shoe has been substantially arrested by engagement with said friction surface.

With reference now to the annexed drawings, 10 designates the drum of a cable hoist or the like and 11 designates the clutch shoes which are to be engaged with the inner surface of the drum 10. Friction elements 12 are provided on the periphery of the shoes 11. A shaft 13, as indicated in Fig. 4, is the element of the clutch which is usually driven, and a support member 14 is bolted to a flange 15 on the shaft 13 by means of bolts 16. Since the clutch includes two axially opposed shoes 11 mounted by similar parts, the mounting and actuating apparatus for only one shoe is described.

The shoe 11 is pivotally secured at one end thereof to an arm 17 by means of a pin 18. One end of the arm 17 is secured loosely to the central portion of the shoe 11 by means of a pin 19 and the bushing arrangement, illustrated in Fig. 3, which comprises the bushings 20 and 21 and the cylindrical member 22 which holds the bushings against the shoe 11 under the influence of the nut 23 on the pin 19. The other end of the arm 17 is pivotally secured to the support member 14 by means of a pin 24. A pin 25 is rigidly secured to the support member 14. An elongated opening 26 is provided in the shoe 11 through which the pin 25 extends so that the pin 25 acts as a guide for movement of the shoe 11. A washer 27 and snap ring 28 are provided on the pin 25 to keep the shoe 11 on the pin 25.

A pin 29 is rigidly secured to the support member 14 and an arm 30 is pivotally secured intermediate of its end to the pin 29. A plate 31 is mounted on the pins 24 and 29 by means of snap rings 32. The end of the arm 30 nearest the axis of the clutch contains a ball bearing 33 which is held on the arm 30 by means of a washer 34 and snap ring 35. A pin 36 is provided on the end of the arm 30 remote from the bearing 33, and a pin 37 is provided on the end of the shoe 11 remote from the arm 17. Mounted between the pins 36 and 37 is a resiliently deformable element indicated generally at 38 in Fig. 1 and illustrated in greater detail in Fig. 2. A tension spring 59 is provided between the plate 31 and the shoe 11.

The resiliently deformable element 38 comprises a rod 39 having in the end thereof a cylindrical depression 40 adapted to embrace the pin 36 and having thereon adjacent to the depression 40, a flange 41. Mounted on the rod 39 is a series of dish-shaped washers 42 wherein the sides of the members of the series contact similar sides of the members adjacent thereto; that is, the convex side of one washer will contact the convex of another washer and the concave side of a washer will contact the concave side of an adjacent washer. The member on one end of the series 42 abuts against the flange 41, and a washer 43, slidably mounted on the shaft 39, contacts the other end of the series. A nut 44 is threaded onto the end of the shaft 39 to restrain the washer 43 against movement off of the shaft. Telescopically engaging the shaft 39 is a sleeve 45 a shoulder 46 of which abuts against the washer 43. A threaded rod 47 extending through a central hole in the sleeve 45 engages loosely in a blind hole 48 in the shaft 39. A nut 49 is provided on the rod 47 to restrict movement of the rod 47 into the sleeve 45. A housing 50 is secured to the rod 47 by means of a flange 51 thereon and a nut 52. A helical spring 53 is provided between the inside end of the housing 50 and the outside end of the sleeve 45. On the end of the rod 47 remote from the rod 39 is provided a cylindrical depression 54 adapted to embrace the pin 37.

Slidably mounted on the shaft 13 is a cam 55 having three adjacent cam surfaces 56, 57, and 58 thereon. The surface 56 is generally parallel to the axis of the shaft 13, and the surfaces 57 and 58 diverge from the axis of the shaft 13 making angles therewith of 30 and 45 degrees respectively.

Figure 2:
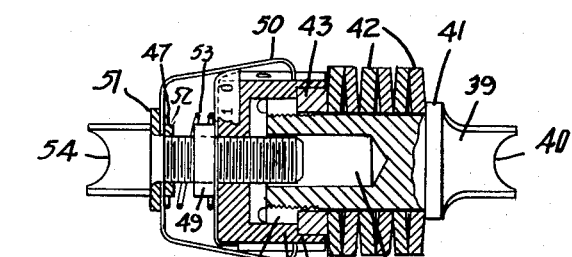
Fig. 2 is an enlarged cross-sectional view of the resiliently deformable element illustrated in Fig. 1.

When the clutch herein illustrated is to be engaged, the cam 55 is slid axially on the rod 13 toward the flange 15 so that the bearings 33 engage with the surfaces 58 and 57 forcing the arms 30 to pivot around the pins 29. As the arms 30 pivot the pins 36 force the deformable elements 38 to move about the axis of the clutch counterclockwise as illustrated in Fig. 1. This movement of the deformable elements 38 effects movement of the pins 37 and resulting movement of the shoes 11.

It should here be noted that the holes in the shoes 11 through which the pins 19 extend are elongated radially of the clutch so as to permit limited rotation of the shoes 11 with respect to the arms 17 about the pins 18. When the clutch is disengaged, the pins 19 contact the edges of these holes closest to the axis of the clutch.

When, as the clutch is engaged, force is applied to the shoes 11 by counterclockwise movement of the elements 38, the pins 19 contacting the radially inward edges of the holes in the shoes 11 prevent rotation between the shoes 11 and the arms 17, so that the shoes 11 will rotate around the pins 24 until the ends of the friction linings 12 adjacent to the pins 37 contact the interior surface of the drum 10. Further counterclockwise movement of the elements 38 will force the pins 18 to rotate around the pins 24 bringing the ends of the linings 12 adjacent the pins 18 into contact with the interior wall of the drum 10. During this further movement, the pins 19 will move toward the outside edge of the hole in the shoes 11 through which they extend.

In this clutch, the dimensions of the different parts, namely the dimensions of the elements 38, the arms 30, and the cam 55, are so chosen that firm contact between the friction linings 12 and the interior surface of the drum will be effected when the bearings 33 on the arms 30 contact an intermediate portion of the surface 57 of the cam 55. At this point the clutch is engaged and rotation of the shaft 13 will effect rotation of the drum 10.

After the clutch is thus engaged, the cam 55 is moved further toward the flange 15 so that the point of contact between the cam 55 and the bearings 33 on the arms 30 moves up the surface 57 onto the surface 56. This movement of the cam 55 causes further rotation of the arms 30 around the pins 29, and since the shoes 11 cannot be moved further because they are already in firm contact with the drum 10, the resiliently deformable elements 38 are compressed.

Resilient compression of the elements 38 is effected when the rods 39 and 47 are forced together so that the sleeve 45 forces the washer 43 to slide on the shaft 39 and flatten the washers 42.

If the internal diameter of the drum changes due to thermal changes, the elements 38 will expand insuring continued firm contact between the linings 12 and the drum 10. When the linings 12 have been worn down, engagement of the clutch will not be effected until the bearings 33 move further up the surface 57 than normal, and the elements 38 will be compressed less than usual. In both cases the element 38 permits the internal parts to adjacent themselves so that firm contact can be maintained between the friction lining and the drum regardless of the radial distance the shoes must move to effect such contact.

Other modes of applying the principle of the invention may be employed, change being made as regards the details described, provided the features stated in any of the following claims, or the equivalent of such, be employed.

We therefore particularly point out and distinctly claim as our invention:

1. A clutch for establishing driving communication between a shaft and a drum comprising in combination a support member adapted to be rigidly secured to said shaft, a shoe having a convex surface adapted to engage the inner surface of said drum, a first arm pivotally secured at one end to said support member and pivotally secured intermediate of its ends to one end of said shoe, the end of said first arm remote from said support member being connected to a central portion of said shoe for limited movement relative thereto, a second arm pivotally secured intermediate of its ends to said support member, a cam slidable axially on said shaft and having a first surface thereon generally parallel to the axis thereof and a second surface thereon diverging obliquely from the axis thereof and terminating in said first surface, said cam adapted to engage one end of said second arm, and resiliently deformable means connecting the other end of said second arm to the end of said shoe remote from said first arm, the dimensions of parts being such that said cam, when contacting said second arm at an intermediate point on said second surface, will effect contact between said shoe and said drum, and said cam, when moved to contact said second arm at a point on said first surface, will maintain said shoe in contact with said drum and compress said resiliently deformable means.

2. The apparatus of claim 1 characterized further in that said resiliently deformable means comprise a rod having a flange thereon, resiliently compressible means mounted on said rod and abutting against one side of said flange, and a sleeve telescopically mounted on the end of said rod and contacting the end of said compressible means remote from said flange.

3. The apparatus of claim 1 characterized further in that said resiliently deformable means comprise a rod having a flange thereon, a series of dish-shaped resilient members mounted on said rod, the end member of said series contacting said flange, said members having their sides abutting against similar sides of the members adjacent thereto, a sleeve telescopically mounted on the end of said rod, and means connecting the end of said sleeve to the end of said series remote from said flange.

References Cited in the file of this patent

UNITED STATES PATENTS

| 811,422 | Menges | Jan. 30, 1906 |
| 2,042,454 | Banker | June 2, 1936 |
| 2,454,271 | Buckendale et al. | Nov. 23, 1948 |

FOREIGN PATENTS

| 6,110 | Great Britain | 1905 |
| 427,569 | Great Britain | Apr. 26, 1935 |
| 518,827 | Germany | Feb. 20, 1939 |